(No Model.)
C. M. FOOTTIT.
LEMON SQUEEZER.
No. 388,352. Patented Aug. 21, 1888.
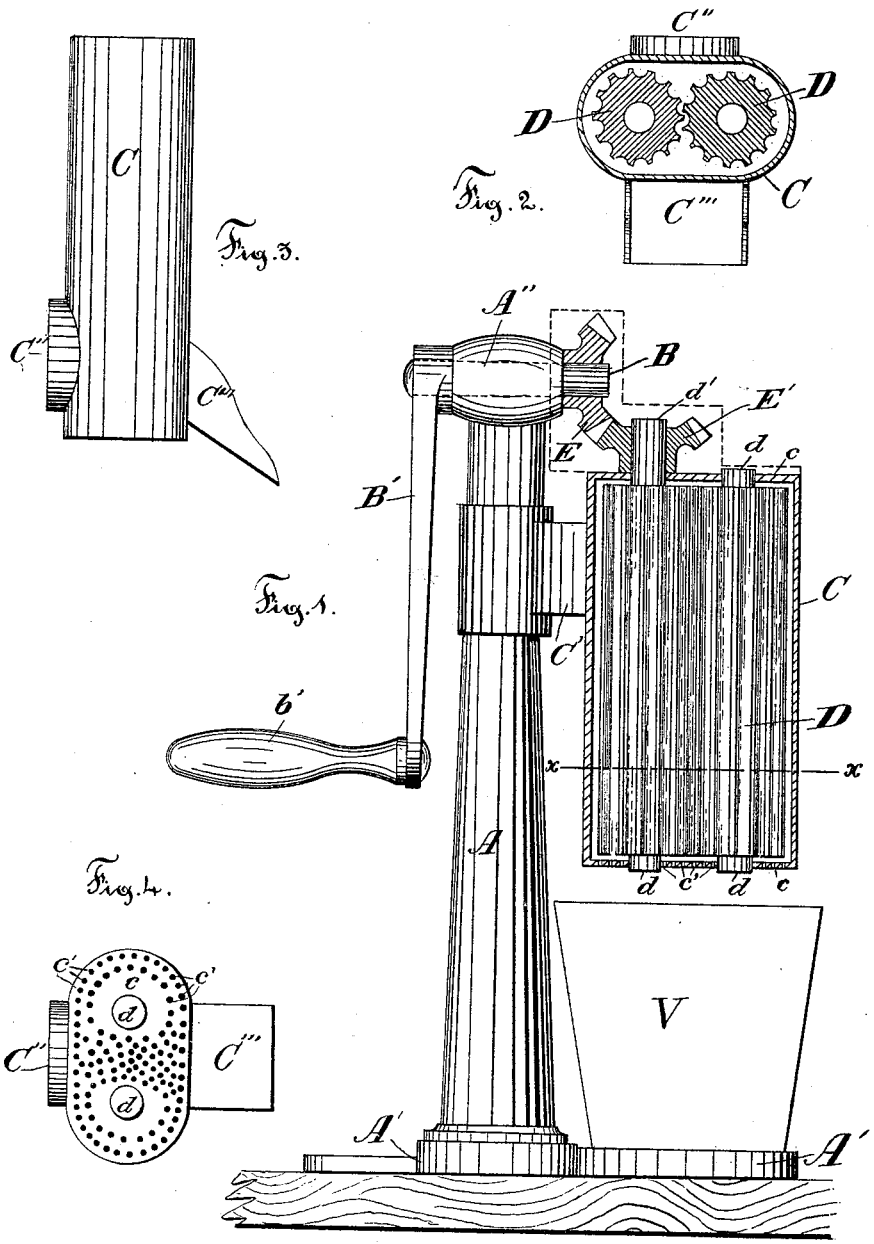

UNITED STATES PATENT OFFICE.

CHARLES MILLER FOOTTIT, OF MARLOW, COUNTY OF BUCKS, ENGLAND.

LEMON-SQUEEZER.

SPECIFICATION forming part of Letters Patent No. 388,352, dated August 21, 1888.

Application filed December 28, 1886. Serial No. 222,847. (No model.) Patented in England June 21, 1886, No. 8,179.

*To all whom it may concern:*

Be it known that I, CHARLES M. FOOTTIT, of Marlow, in the county of Bucks, England, have invented new and useful Improvements in Lemon-Squeezers, (for which I have obtained a patent in Great Britain, No. 8,179, bearing date June 21, 1886,) of which the following is a specification, reference being had to the accompanying drawings, forming a part hereof.

My invention relates to the construction of a mechanical device for expressing or extracting the juice from lemons and other fruits.

The object of my invention is the production of an implement or machine which can be placed or secured upon a counter, table, or the like, and into which the fruit from which the juice is to be extracted may be fed and the juice extracted by turning a handle which operates a pair of fluted rollers.

Figure 1 is an elevation of my improved squeezer, partly in section. Fig. 2 is a horizontal section of the roller-casing on line $x$ $x$, Fig. 1. Fig. 3 is a front elevation of the roller-casing. Fig. 4 is a bottom view of the same.

A is a pillar or post provided with a base, A', adapted to be screwed or otherwise secured to a table or other support, and to hold a cup, tumbler, or other receiving-vessel, V, for the expressed juice, the pillar and base thus forming a suitable stand. The upper end of the pillar A is provided with a hub, A'', adapted for a horizontal bearing of a short shaft, B, upon one end of which latter is secured the crank B', with handle $b'$, and at the other a bevel or miter wheel, E.

C is a vertical casing secured to the pillar by a neck or bracket, C', and adapted to accommodate a pair of fluted rollers which have their axles journaled in the ends $c$. This casing is provided on one of its flat sides with a mouth or feed-opening, C'', for the insertion of the fruit, and with a spout, C''', opposite said mouth, for the discharge of the waste or pulp. The bottom end of the casing is provided with perforations $c'$ to allow the expressed juice to run through.

D D are a pair of vertical fluted (or corrugated) rollers journaled in the ends of the casing $c$ $c$ by pintles or axles $d$ $d'$. The flutings of these rollers are deep, so as to adapt them to be geared together bodily and loosely, allowing space between them for the fruit-pulp. The upper axle, $d'$, of the roller nearest the pillar A is made longer and provided with a bevel or miter wheel, E', gearing with the wheel E upon the crank-shaft B. This gearing may be incased, as shown by dotted lines in Fig. 1.

The operation of this implement is as follows: Motion is given to the rollers D by turning the crank B'. The lemon or other fruit is fed into the mouth C' and is engaged by the rollers and crushed and pressed in its passage between them, the pressed pulp being discharged by the spout C'' and the juice flowing through the perforations $c'$ into the vessel V.

I claim as my invention—

1. In a lemon-squeezer, the combination of a pillar, A, provided with a base, A', and hub A'', a shaft, B, journaled in said hub, a crank, B', secured to the shaft, a casing, C, firmly secured to said pillar and provided with mouth C'', spout C''', and perforated bottom $c$, the fluted rollers D, geared together and journaled in the ends of said casing, and the bevel-gears E E', connecting said shaft B and one of the rollers D, substantially as set forth.

2. In a lemon-squeezer, the combination of the casing C, secured to a stand and provided with a mouth, spout, and perforated bottom, rollers D, journaled within said casing, geared together, and having surfaces adapted to engage fruit fed between them, and gearing adapted to give motion to said rollers, substantially as set forth.

In testimony that I claim the foregoing I have hereunto set my hand this 4th day of November, 1886.

CHARLES MILLER FOOTTIT.

Witnesses:
JAMES STEVENSON,
ALFRED MELHUISH.